United States Patent
Deluca et al.

(10) Patent No.: US 11,455,579 B2
(45) Date of Patent: Sep. 27, 2022

(54) LOCATION RESERVATION SIGNALING

(71) Applicant: INTERNATIONAL BUSINESS MACHINES CORPORATION, Armonk, NY (US)

(72) Inventors: Lisa Seacat Deluca, Baltimore, MD (US); Simon Pink, Edinburgh (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 241 days.

(21) Appl. No.: 16/585,145

(22) Filed: Sep. 27, 2019

(65) Prior Publication Data

US 2021/0097450 A1   Apr. 1, 2021

(51) Int. Cl.
*G06Q 10/00* (2012.01)
*G06Q 10/02* (2012.01)
(Continued)

(52) U.S. Cl.
CPC ......... *G06Q 10/02* (2013.01); *G06Q 10/1095* (2013.01); *G08B 5/36* (2013.01);
(Continued)

(58) Field of Classification Search
None
See application file for complete search history.

(56) References Cited

U.S. PATENT DOCUMENTS

| 8,743,138 B2 | 6/2014 | Padmanabh et al. |
| 2014/0100900 A1* | 4/2014 | Abhyanker .......... G06Q 10/087 705/5 |

(Continued)

FOREIGN PATENT DOCUMENTS

| CN | 205281554 | 6/2016 |
| FR | 3050051 | 10/2017 |

(Continued)

OTHER PUBLICATIONS

Tran et al. published article "A smart meeting room scheduling and management system with utilization control and ad-hoc support based on real-time occupancy detection", 2016, IEEE (Year: 2016).*

(Continued)

*Primary Examiner* — Naresh Vig
(74) *Attorney, Agent, or Firm* — F. Chau & Associates, LLC

(57) ABSTRACT

Systems and methods for reservation signaling are described. The systems and methods may determine that a user has entered a location, check whether a reservation for the location is set for a current time period, and provide a sensory signal based on the check. In some cases, the systems and methods may include a smart lighting system configured to provide a plurality of colors of room lighting, and may provide a first lighting color for the room indicating a first time amount remaining; and provide a second lighting color for the room indicating a second time amount remaining. In some cases, the systems and methods may provide a suggestion of a different location for the user, where the suggestion includes an indication of a sensory signal for the new location, and then provide the sensory signal at the new location.

16 Claims, 8 Drawing Sheets

(51) Int. Cl.
  *G06Q 10/10* (2012.01)
  *H04N 7/15* (2006.01)
  *G08B 5/36* (2006.01)
  *H04W 4/021* (2018.01)
  *H05B 45/20* (2020.01)
(52) U.S. Cl.
  CPC .............. *H04N 7/15* (2013.01); *H04W 4/021* (2013.01); *H05B 45/20* (2020.01)

(56) References Cited

U.S. PATENT DOCUMENTS

| | | | | |
|---|---|---|---|---|
| 2018/0039918 A1* | 2/2018 | Koga | ...................... | G06Q 50/30 |
| 2018/0288848 A1* | 10/2018 | Gao | ........................ | H05B 45/14 |
| 2019/0370700 A1* | 12/2019 | Ludwig | .................. | G06Q 10/00 |

FOREIGN PATENT DOCUMENTS

| | | | | |
|---|---|---|---|---|
| FR | 3050051 A1 * | 10/2017 | ......... | G06Q 10/0631 |
| JP | 2018-85045 | 5/2018 | | |
| WO | 2017142541 | 8/2017 | | |
| WO | WO-2017142541 A1 * | 8/2017 | ............. | G06Q 10/02 |
| WO | WO-2020040241 A1 * | 2/2020 | ............. | G06Q 10/00 |

OTHER PUBLICATIONS

Muller et al. published article "Ambient Timer—Unobtrusively Reminding Users of upcoming tasks with ambient light", Oct. 14-17, 2012, NordiCHI' 12, Copenhagen, Denmark (Year: 2012).*
Published article understanding active & passive infrared sensors (PIR) and their uses, Sep. 18, 2018, www.arrow.com (Year: 2018).*
Mueller et al. Published article, "Ambient Timer—Unobtrusively Reminding Users of upcoming tasks with ambient light", 2013, INTERACT 2013, pp. 211-228 (Year: 2013).*
Published article "The Automatic Hotel", Dec. 1, 2010, www.hotelmanagement-network.com (Year: 2010).*
Lights when approaching the car, 2013, Club Lexus (Year: 2015).*
Crestron® Room Scheduling Panels, User Guide. Creston Electronics, Inc. (26 pps) [internet: URL:https://www.crestron.com/getmedia/956485d6-257f-429f-b722-a7fcd9526f99/mg_ug_crestron_room_scheduling_panels].

* cited by examiner

Reserved

Available

LOCATION RESERVATION SIGNALING

BACKGROUND

The following relates generally to resource reservation, and more specifically to reservation signaling.

A variety of reservation systems are used to coordinate times when different people may use shared resources, such as meeting rooms in an office building. However, people often need to find a space to take an unplanned call or meeting within an office building. In many cases, the scheduling information is not immediately available to a person looking for such a location.

If a person enters a room that is already scheduled, it may cause conflict and interruption. These interruptions can have a significant impact on productivity. Therefore, there is a need in the art for improved systems and methods of signaling whether shared resources are available.

SUMMARY

A method, apparatus, and non-transitory computer readable medium for reservation signaling are described. Embodiments of the method, apparatus, and non-transitory computer readable medium may determine that a user has entered a location, check whether a reservation for the location is set for a current time period, and provide a sensory signal based on the check.

Another method, apparatus, and non-transitory computer readable medium for reservation signaling is described. The method, apparatus, and non-transitory computer readable medium may include a smart lighting system configured to provide a plurality of colors of room lighting; a processor, and a memory storing instructions and in electronic communication with the processor; wherein the processor is configured to execute the instructions to identify an end time of a reservation for a room; provide a first lighting color for the room, wherein the first lighting color indicates a first time amount remaining before the end time; and provide a second lighting color for the room, wherein the second lighting color indicates a second time amount remaining before the end time.

Another method, apparatus, and non-transitory computer readable medium for reservation signaling are described. The method, apparatus, and non-transitory computer readable medium may identify a user that has entered a location; determine that the user is not associated with a reservation for the location; provide a suggestion of a different location for the user, wherein the suggestion includes an indication of a sensory signal for the new location; and provide the sensory signal at the new location.

DETAILED DESCRIPTION

Figure 1:
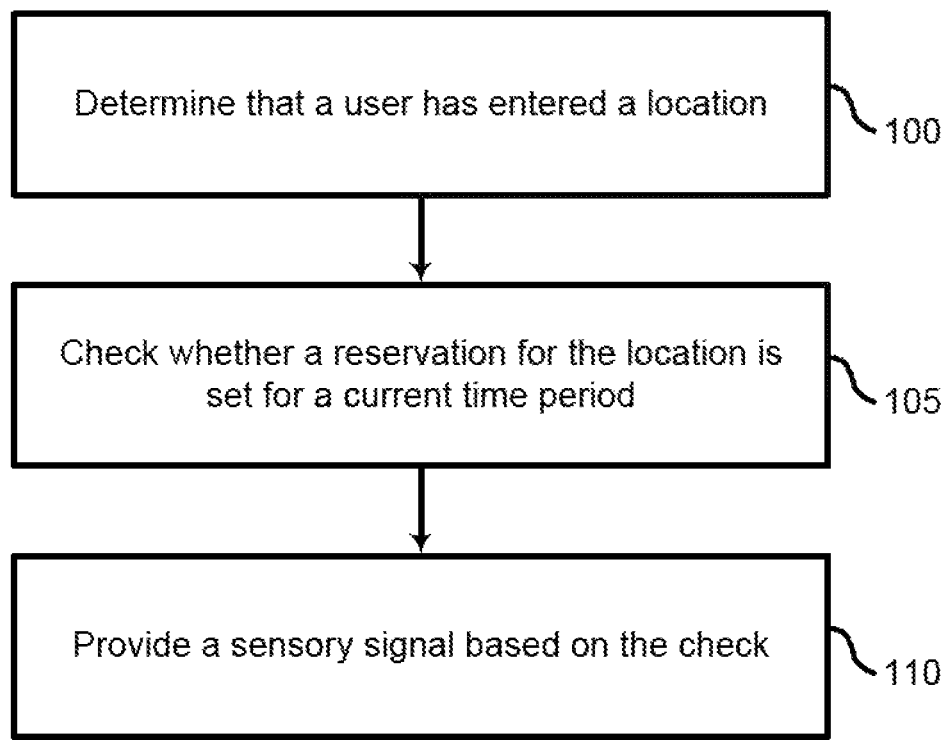
FIG. 1 shows an example of a process for occupancy detection and lighting system in accordance with aspects of the present disclosure.

The present disclosure describes reservation signaling systems and methods to determine real time occupancy and compare the occupancy to a reservation booking system. Once the reservation status is determined, the information may be signaled to a user at a location via a smart lighting system or another sensory system at the location. Thus, the system may modify the lighting of a room to reflect the reservation status visually to one or more persons in need of a meeting room. For example, red room lighting may be used if a user enters a room that is already schedule by someone else. Green lighting may indicate that the user is in the correct location for their own reservation, and blue lighting may indicate that the location is not reserved. In some examples, the system may suggest another available room and use another color (i.e., purple) in the available room to direct the user to that room.

Embodiments of the present disclosure may be incorporated into productivity tools used by organizations with multiple conference rooms and meeting spaces. For example, monitors mounted on the walls outside each room allow anyone to see if a room is available or in use, and view details about the current meeting as well as the room's entire schedule. Upcoming meetings and open time slots may be displayed on a scrolling calendar ribbon, and users can reserve a room on the spot using the monitor (i.e., a touch screen). This may eliminate confusion over whether a room is booked (by whom and for how long) and allows attendees to verify if the they are in the right place before entering a room.

In an example scenario, a first user enters a meeting space. The meeting space is equipped with smart lighting and the system recognizes the entry of the first user through various real-time occupancy techniques. The system then confirms if an existing reservation for the meeting space conflicts with the first user. If no reservation is established for the meeting space, the smart lighting indicates that the users are safe to occupy the space. The smart lighting may also indicate to the user how much time is left until the space is booked. The reservation system can attempt to reserve the meeting space for the user. Upon successful booking, the smart lighting may indicate to the user that a reservation has been booked.

If there is successful booking, the reservation time may be set for a default period and may be set based on a prompt to the first user through a communication channel such as a smart assistant in the room and/or a mobile application. The reservation time may be learned through user activity If a reservation is already established for the desired meeting space, the system may correlate the first user with the reservation name, or names, on the scheduled booking system. If the first user is confirmed, then the smart lighting may show a confirmed indication. This confirms that the user or users are in the right place. If the space has been reserved by someone else, the smart lighting may indicate that the room is booked. The smart lighting may also indicate the likelihood of the participants who are scheduled to occupy the space may occupy the meeting space. The smart lighting, in combination with a virtual assistant, may also suggest an alternative room to use that may not be occupied or has no reservations.

If the meeting room is not reserved after the scheduled time, the lights may flash a predetermined color to indicate that the occupants have more time to finish any discussions. The system would then extend the meeting for a predetermined amount of time for that user. When the user is done using the meeting space, the user can exit the meeting space just as the user would normally do. The lighting may then return to its default settings.

FIG. 1 shows an example of a process for occupancy detection and lighting system in accordance with aspects of the present disclosure. In some examples, these operations may be performed by a reservation signaling system including a processor executing a set of codes to control functional elements of an apparatus. Additionally, or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 100, the system determines that a user has entered a location. The location may be, but is not limited to a conference room, an agile workspace (open air), a phone booth, a dedicated desk, or a floor. The system can determine the that the user entered or approached the location using a Wi-Fi occupancy sensor, a camera, a Bluetooth beacon sensor, a GPS device, a door sensor, or any combination thereof. In some cases, the operations of this step may refer to, or be performed by, a detection component as described with reference to FIG. 8.

Embodiments of the disclosure include monitoring output signals of sensors within a room, and comparing output signals with one or more predetermined thresholds to detect users at a given location. The sensor data may be correlated to identify any uncertainty in detecting the occupancy. In some cases, a machine learning model may be used to determine whether a person has entered a location, identify the person, or both.

In some cases, detecting users at the location includes processing output from one or more image and/or video sensors based on the correlation to obtain occupancy status information when there is uncertainty in detecting occupancy. The occupancy status information may be displayed on one or more user devices.

At operation 105, the system checks whether a reservation for the location is set for a current time period. The system may determine whether the user is associated with the reservation at a location. In some cases, the operations of this step may refer to, or be performed by, a reservation component as described with reference to FIG. 8. In some cases, the reservation signaling system may be integrated with a reservation system. In other embodiments, the reservation signaling system may transmit a request to a separate reservation scheduling system, and receive the reservation information in response to the request.

At operation 110, the system provides a sensory signal based on the check. The sensory signal comprises an indication that the location is or is not available and whether the location is correct. The sensory signal may be provided from equipment at the location (i.e., via a smart lighting or sound system). In some cases, the sensory signal is provided to a user via a personal electronic device. Examples of sensory signals include lighting and music. For example, different colors, sounds or songs may be associated with open rooms, occupied rooms, and reserved rooms. In some cases, the operations of this step may refer to, or be performed by, a signal component as described with reference to FIG. 8.

Figure 2:
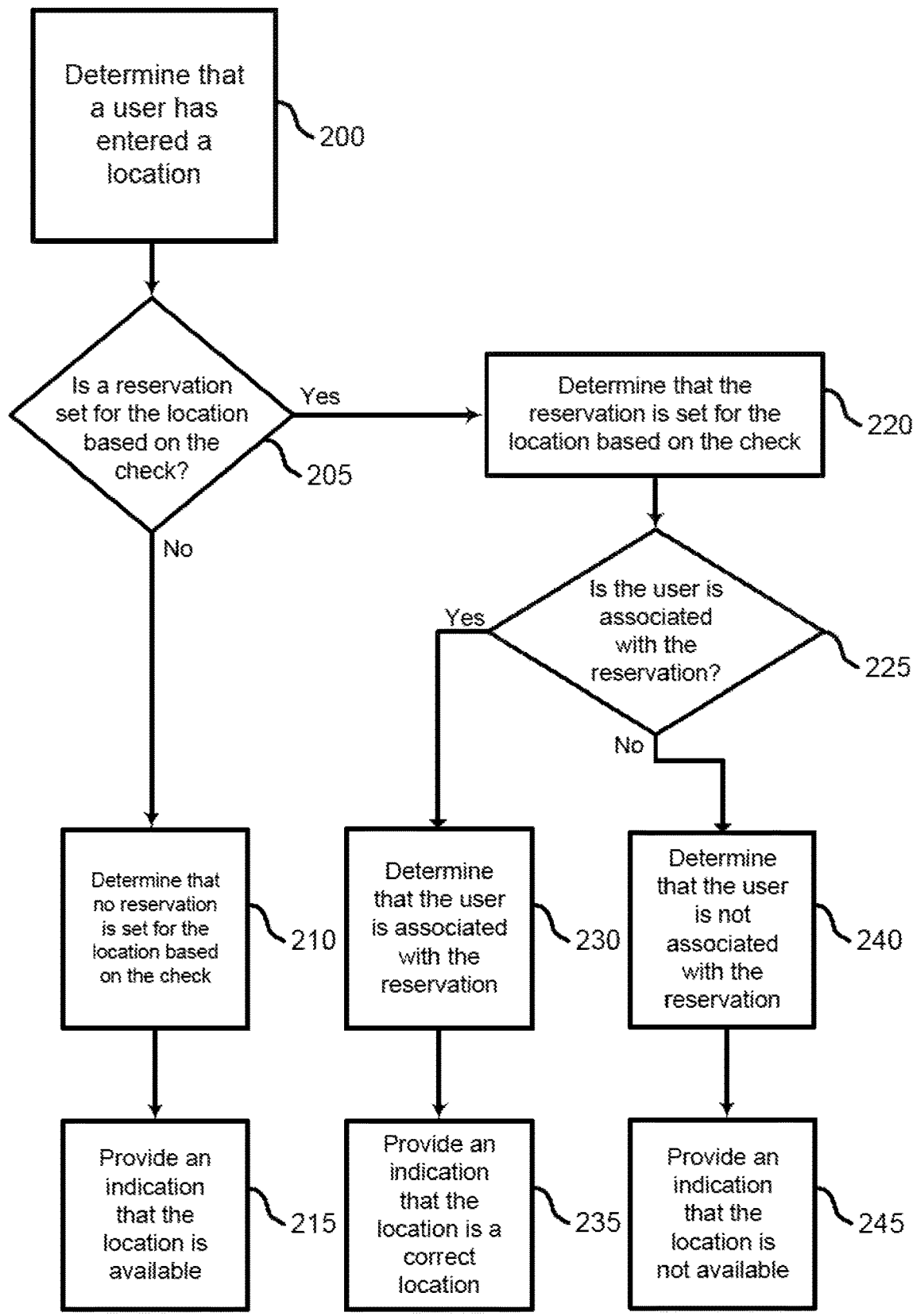
FIG. 2 shows an example of a process for reservation signaling in accordance with aspects of the present disclosure.

FIG. 2 shows an example of a process for reservation signaling in accordance with aspects of the present disclosure. In some examples, these operations may be performed by a system including a processor executing a set of codes to control functional elements of an apparatus. Additionally, or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 200, the system determines that a user has entered a location. In some cases, the operations of this step may refer to, or be performed by, a detection component as described with reference to FIG. 8. At operation 205, the system checks whether a reservation for the location is set for a current time period. In some cases, the operations of this step may refer to, or be performed by, a reservation component as described with reference to FIG. 8.

If the system determines that a reservation is not set for a current time period, then at operation 210, the system determines that no reservation is set for the location based on the check. In some cases, the operations of this step may refer to, or be performed by, a reservation component as described with reference to FIG. 8. When the system determines that no reservation is set based on the check, at operation 215, the system provides an indication that a location is available.

In reference to operation 205, if the system determines that a reservation is set for the current time period, then at operation 220, the system determines that the reservation is set for the location based on the check. After the system determines that a reservation is set for the current time period, at operation 225, the system determines whether the user is associated with the reservation. At operation 230, if the user is associated with the reservation, the system determines that the user is associated with the reservation, then at operation 235, the system provides an indication that the location is a correct location.

In reference to operation 225, if the user is not associated with the reservation, then at operation 240, the system determines that the user is not associated with the reservation. At operation 245, the system provides an indication that the location is not available.

Figure 3:
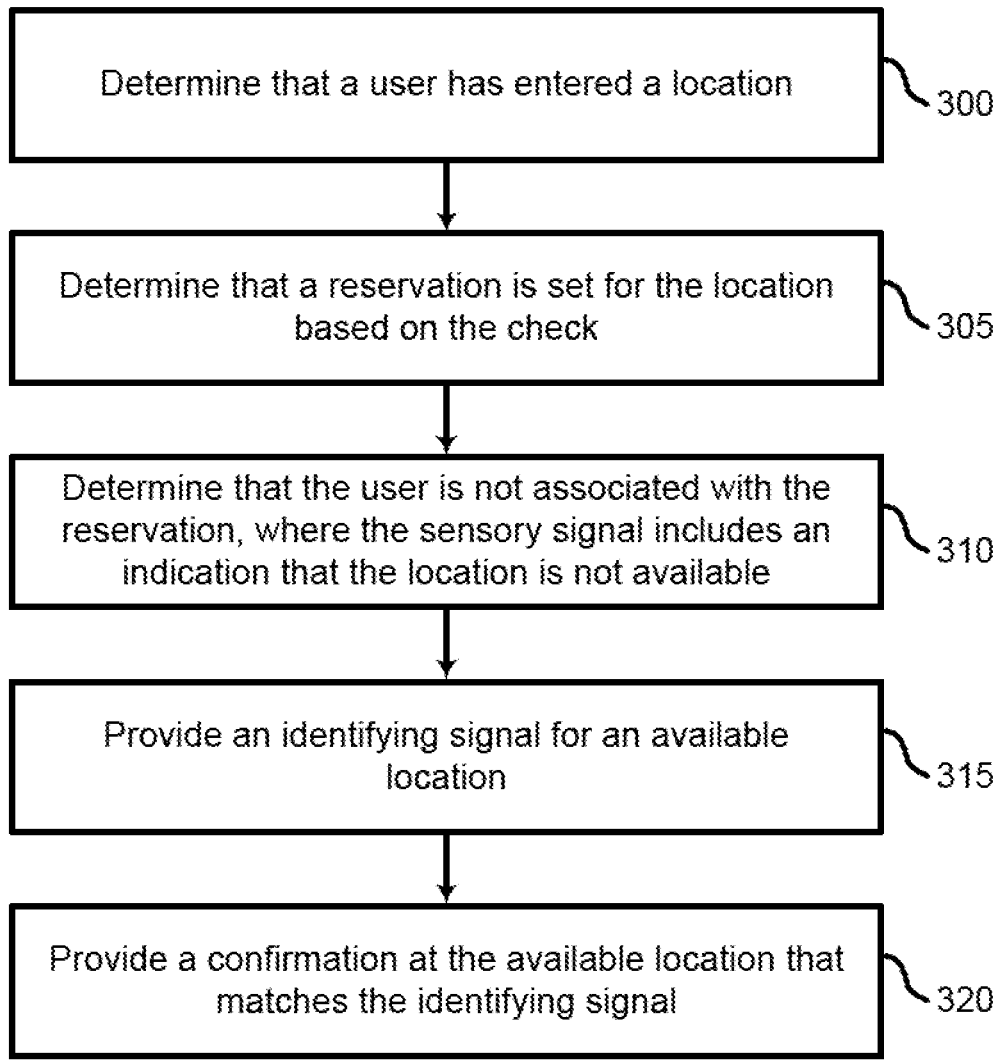
FIG. 3 shows an example of a process to alert a user of an open room in accordance with aspects of the present disclosure.

FIG. 3 shows an example of a process to alert a user of an open room in accordance with aspects of the present disclosure. In some examples, these operations may be performed by a system including a processor executing a set of codes to control functional elements of an apparatus. Additionally, or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

As an example of the systems capabilities, the following is a scenario from the present disclosure. A user receives a call from a manager and is currently at their workstation. The user works in an open floor space and wants to take the call in private so the user walks to the closest phone booth area to take the call. Using the proposed disclosure, the system glows a predetermined color to let the user know that someone else has booked this space.

The system then glows a first predetermined color to tell the user to instead find the phonebooth room that is a second predetermined color, which is free. If the user has a workplace mobile application, an alert may show up on the user's cellphone also telling the user to find the room glowing a second predetermined color. The user then moves to the second predetermined color room and takes the call with her manager.

The colors used can be personalized per the user and are not limited to colors referenced in the disclosure. When the user walks towards a phonebooth, a room begins glowing a predefined color or pattern to let the user know that the system knows the user is coming, and a room is ready. Using the users speed, direction, and device accelerometer or other presence indicators, the system could determine that the user is likely moving towards the space. This process would be possible before the user walks into a space. Based on a learned behavior of knowing that the user may likely need a space, the system can anticipate the user's presence.

Some rooms may have the ability to light up with multiple colors as once. Rather than a single pattern of, for example, red then purple, the system may have a red light and a purple light illuminated at the same time to let the user know that a room is booked but to go find a purple room. Red may signify that a room is reserved, while purple may signify that a room is available. The system can provide feedback to an online booking system to align with rules to cancel bookings that are not occupied after a predetermined set of time, clearing the scheduling for new bookings made through an online booking system.

At operation 300, the system determines that a user has entered a location. In some cases, the operations of this step may refer to, or be performed by, a detection component as described with reference to FIG. 8.

At operation 305, the system determines that a reservation is set for the location based on the check. In some cases, the operations of this step may refer to, or be performed by, a reservation component as described with reference to FIG. 8.

At operation 310, the system determines that the user is not associated with the reservation, where the sensory signal includes an indication that the location is not available. In some cases, the operations of this step may refer to, or be performed by, a reservation component as described with reference to FIG. 8.

At operation 315, the system provides an identifying signal for an available location. For example, the system may provide a room location or room number, along with a color that will be used for room lighting (or an image, song, or some other sensory signal). In some cases, the operations of this step may refer to, or be performed by, a signal component as described with reference to FIG. 8.

At operation 320, the system provides a confirmation at the available location that matches the identifying signal. For example, the color, image or song that was previously provided to the user may be displayed at the available location. In some cases, the operations of this step may refer to, or be performed by, a signal component as described with reference to FIG. 8.

Figure 4:
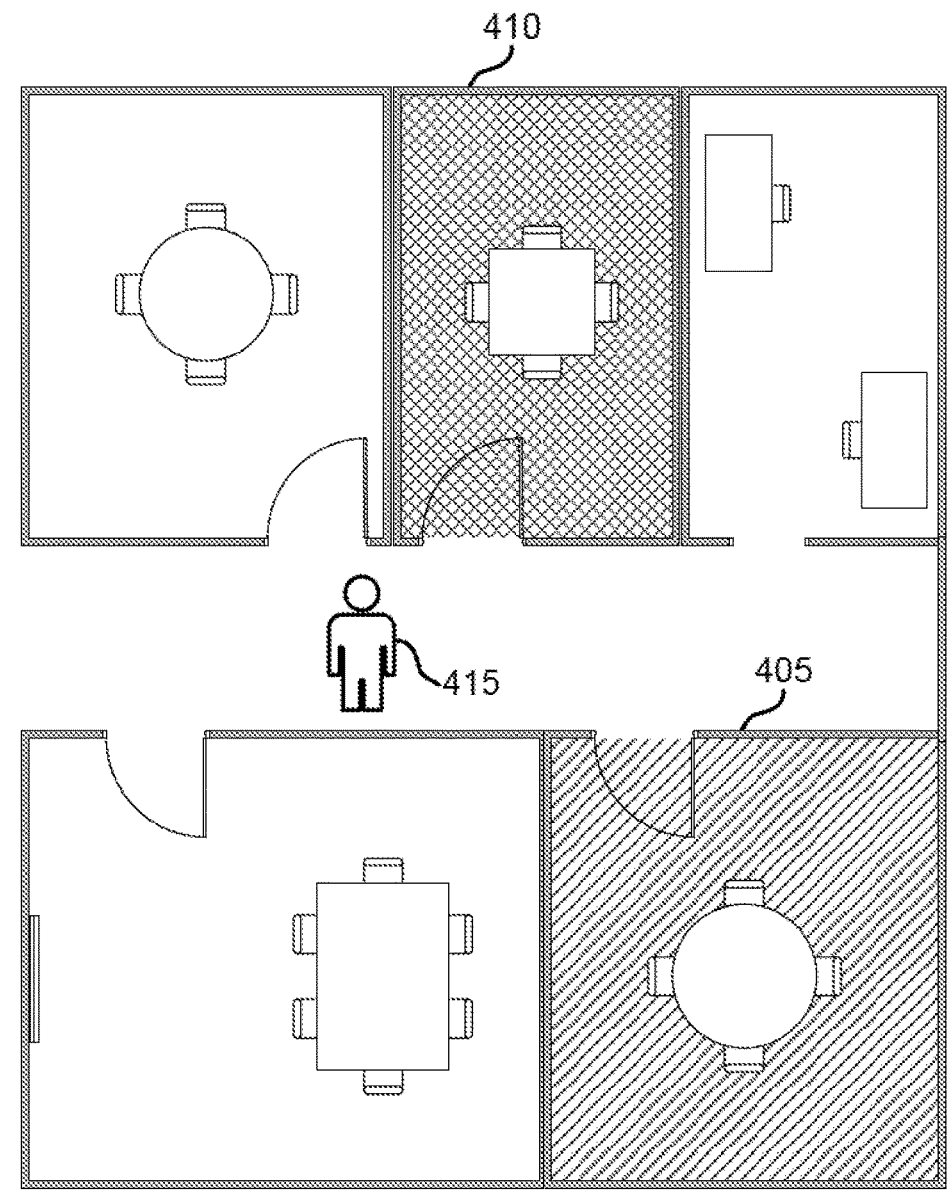
FIG. 4 shows an example of meeting space lighting in accordance with aspects of the present disclosure.
Figure 4:
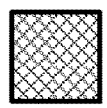
Figure 4:
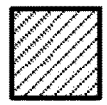

FIG. 4 shows an example of meeting space lighting in accordance with aspects of the present disclosure. Specifically. FIG. 4 shows how meeting space lighting may be used to indicate that a reserved room 410 is not available, and then direct the user 415 to an available room 410. The example shown includes meeting space 400 and user 415. Meeting space 400 may include reserved room 405 and available room 410. In an example embodiment, a user 415 approaches or enters reserved room 410. The system then checks the reservation status and determines that reserved room 410 is reserved, and that user 415 is not associated with the reservation (as described above with reference to FIG. 3). Then the reservation signaling system may adjust the lighting (or music, or other sensory signal) in reserved room 410 to indicate is not available.

Then, the reservation signaling system may provide the user 415 with an indication of the available room 405. For example, the system may send a message to a mobile device of the user 415, or display information on a panel outside the reserved room 410. The information may include a location of the available room 405, and an indication of a color that will be displayed by smart lighting within the available room 405. Thus, the user 415 may easily locate the available room 405.

Figure 5:
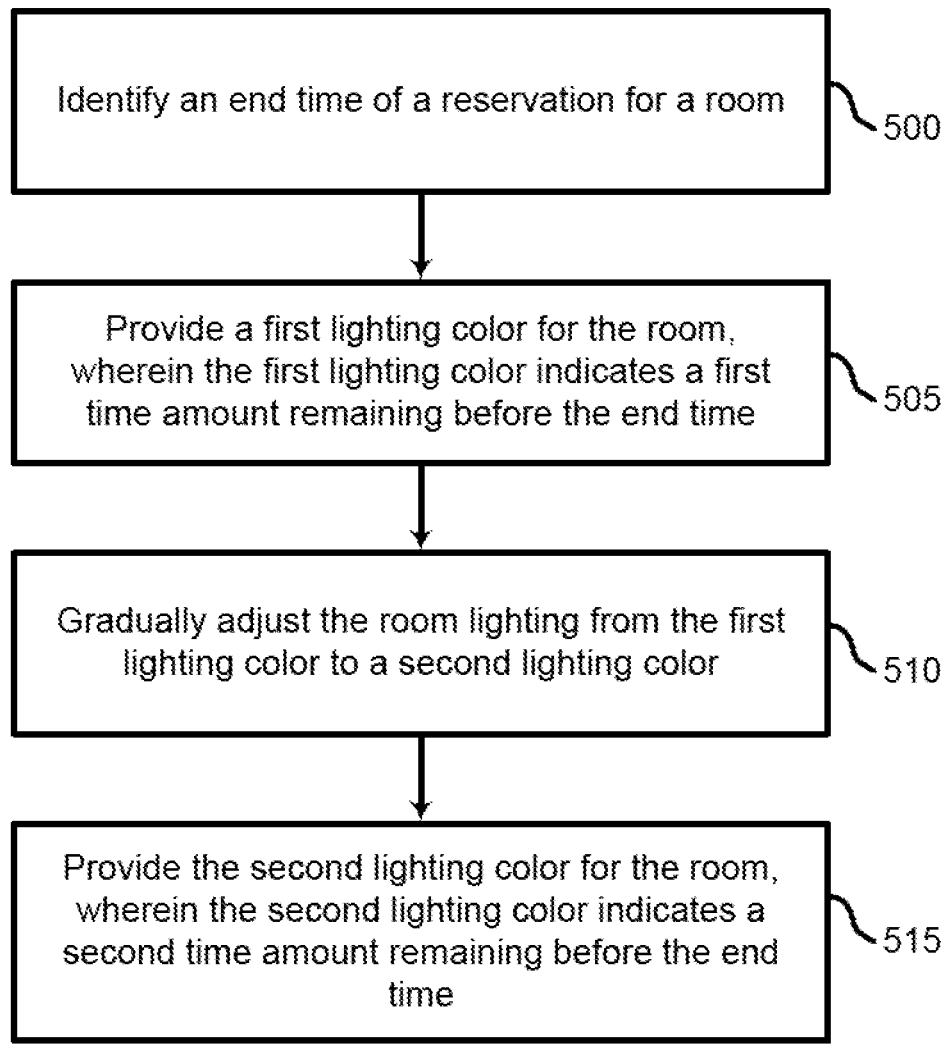
FIG. 5 shows an example of a process for adjusting a sensory signal in accordance with aspects of the present disclosure.

FIG. 5 shows an example of a process for adjusting a sensory signal in accordance with aspects of the present disclosure. In some examples, these operations may be performed by a system including a processor executing a set of codes to control functional elements of an apparatus. Additionally, or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

As illustrated in FIG. 5, when a user or users are nearing the end time of their reservation, the smart lighting (or sound system) equipped meeting space may change in color, pattern, or both to warn the users are almost out of time.

At operation 500, the system identifies an end time of a reservation for a room, in some cases, the operations of this step may refer to, or be performed by, a reservation component as described with reference to FIG. 8.

At operation 505, the system provides a first lighting color for the room, wherein the first lighting color indicates a first time amount remaining before the end time. In some cases, the operations of this step may refer to, or be performed by, a signal component as described with reference to FIG. 8.

At operation 510, the system time gradually adjust the room lighting from the first lighting color to the second lighting color. In some cases, the operations of this step may refer to, or be performed by, a signal component as described with reference to FIG. 8.

At operation 515, the system adjusts the sensory signal over time as the reservation nears completion, in some cases, the operations of this step may refer to, or be performed by, a signal component as described with reference to FIG. 8.

Figure 6:
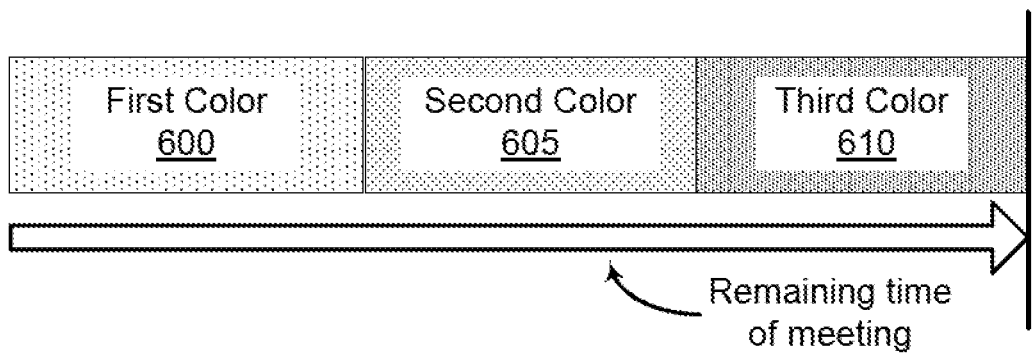
FIG. 6 shows an example of a visual signal for remaining time in accordance with aspects of the present disclosure.

FIG. 6 shows an example of a visual signal for remaining time in accordance with aspects of the present disclosure. The example shown includes first color 600, second color 605, and third color 610. Each of these colors may be displayed in a room (either using ambient lighting, or on a screen) at a different time during the course of a reservation. A first color 600 may be representative of the beginning of the meeting time. A second color 605 is representative of a specific time prior to the end of a meeting (i.e., 15 minutes prior to the end of the reservation). Second color 605 may be gradually adjusted as the end of the meeting grows closer (i.e., from yellow to orange to red). Finally, at the end of the reservation time, a third color 610 may be displayed in the room.

In some examples, signals other than color may also be used to indicate that the end of a reservation is near. For example, a clock may display a countdown timer. A sound pattern may also be used to indicate how much time is left (e.g., a number of beeps indicating a number of minutes left).

Figure 7:
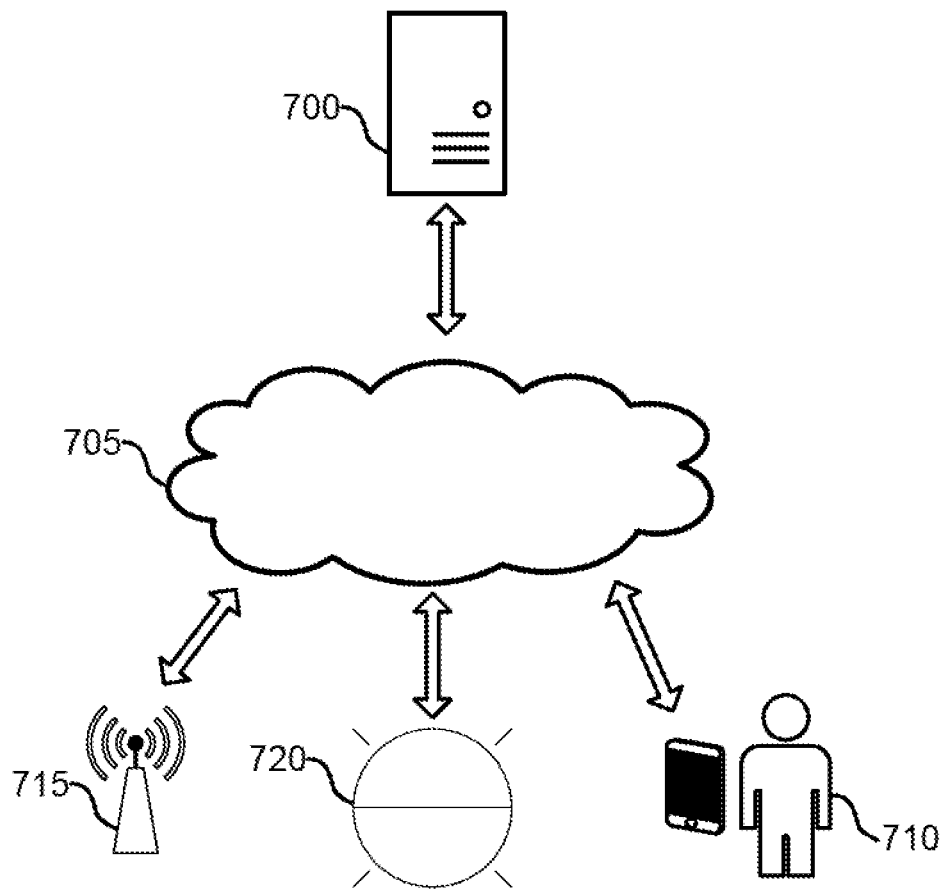
FIG. 7 shows an example of a reservation signaling system in accordance with aspects of the present disclosure.

FIG. 7 shows an example of a reservation signaling system in accordance with aspects of the present disclosure. The example shown includes server 700, network 705, user 710, sensor 715, and lighting system 720. The server 700 may control the reservation signaling system by receiving input from sensor 715 to determine the location of the user 710, and controlling the lighting system (or sound system, or other sensory system) to communicate with user 710. In some cases, the user may receive signals via a mobile electronic device.

According to embodiments of the present disclosure, user location may be gathered from the sensor 715 (i.e. via a Wi-Fi occupancy sensor, a camera, a Bluetooth beacon sensor, a GPS device, a door sensor, etc.). The user 710 position may be analyzed by the server 700. The positioning may be compared to a reservation system of a meeting space to determine if the user 710 has any conflict with prescheduled reservations. If a conflict is determined, lighting system 720 will notify user 710 that the meeting space is occupied. If no conflict is determined, the lighting system 720 will notify user 710 that the meeting space is unoccupied. Additionally, if the user 710 has set up a reservation of a meeting space, lighting system 720 will notify user 710 that user 710 is in the correct meeting space.

Server 700 may be an example of, or include aspects of, the corresponding element or elements described with reference to FIG. 8. User 710 may be an example of, or include aspects of, the corresponding element or elements described with reference to FIG. 4.

Figure 8:
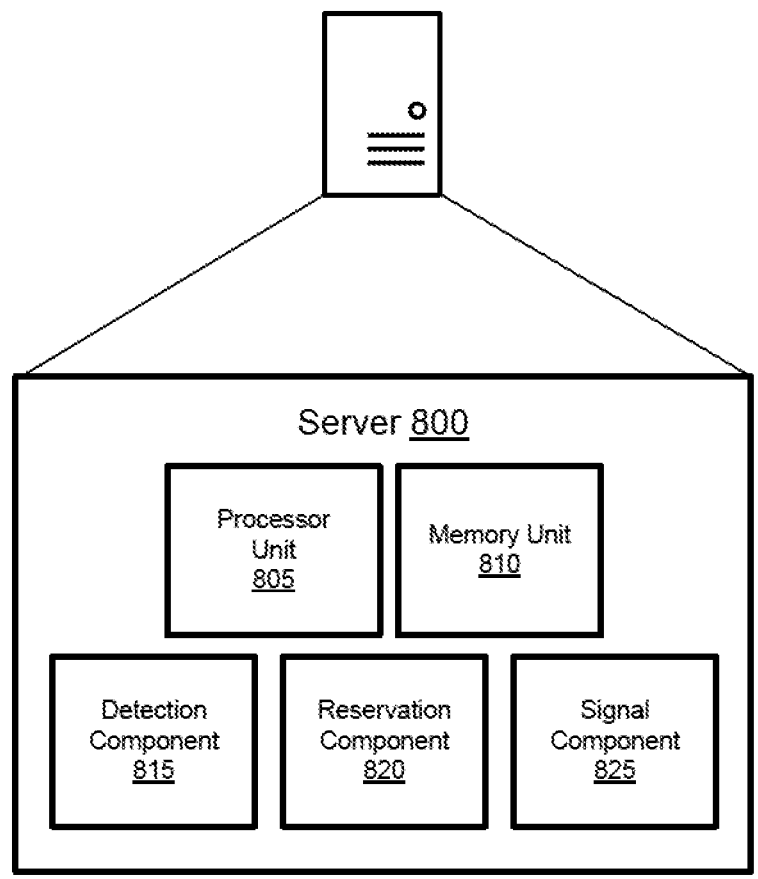
FIG. 8 shows an example of a reservation signaling apparatus in accordance with aspects of the present disclosure.

FIG. 8 shows an example of a reservation signaling apparatus in accordance with aspects of the present disclosure. Server 800 may be an example of, or include aspects of, the corresponding element or elements described with reference to FIG. 7. Server 800 may include processor unit 805, memory unit 810, detection component 815, reservation component 820, and signal component 825.

A processor unit 805 may include an intelligent hardware device, (e.g., a general-purpose processing component, a digital signal processor (DSP), a central processing unit (CPU), a graphics processing unit (CPU), a microcontroller, an application specific integrated circuit (ASIC), a field programmable gate array (FPGA), a programmable logic device, a discrete gate or transistor logic component, a discrete hardware component, or any combination thereof). In some cases, the processor may be configured to operate a memory array using a memory controller. In other cases, a memory controller may be integrated into processor. The processor may be configured to execute computer-readable instructions stored in a memory to perform various functions.

A memory unit 810 may store information for various programs and applications on a computing device. For example, the storage may include data for running an operating system. The memory may include both volatile memory and non-volatile memory. Volatile memory may random access memory (RAM), and non-volatile memory may include read-only memory (ROM), flash memory, electrically erasable programmable read-only memory (EE-PROM), digital tape, a hard disk drive (HDD), and a solid-state drive (SSD). Memory may include any combination of readable and/or writable volatile memories and/or non-volatile memories, along with other possible storage devices.

Detection component 815 determines that a user has entered a location, and may also receive input from a Wi-Fi occupancy sensor, a camera, a Bluetooth beacon sensor, a OPS device, a door sensor, or any combination thereof, where the determination that the user has entered the location is based on the input. In some examples, the location includes a conference room, an agile workspace, a phone booth, a desk, a workspace, an automobile, or any combination thereof. Detection component 815 may also determine that a personal electronic device of the user is at the location.

In some examples, detection component 815 may include an artificial neural network (ANN) which may represent a prediction model for identifying when a user intends to enter a location, or to identify a specific user. An ANN may be a hardware or a software component that includes a number of connected nodes (a.k.a., artificial neurons), which may be seen as loosely corresponding to the neurons in a human brain. Each connection, or edge, may transmit a signal from one node to another (like the physical synapses in a brain). When a node receives a signal, it can process the signal and then transmit the processed signal to other connected nodes. In some cases, the signals between nodes comprise real numbers, and the output of each node may be computed by a function of the sum of its inputs. Each node and edge may be associated with one or more node weights that determine how the signal is processed and transmitted.

During the training process, these weights may be adjusted to improve the accuracy of the result (i.e., by minimizing a loss function which corresponds in some way to the difference between the current result and the target result). The weight of an edge may increase or decrease the strength of the signal transmitted between nodes. In some cases, nodes may have a threshold below which a signal is not transmitted at all. The nodes may also be aggregated into layers. Different layers may perform different transformations on their inputs. The initial layer may be known as the input layer and the last layer may be known as the output layer. In some cases, signals may traverse certain layers multiple times.

Reservation component 820 may check whether a reservation for the location is set for a current time period and may also determine that no reservation is set for the location based on the check, where the sensory signal includes an indication that the location is available and reserve the location for the user. Reservation component 820 may also determine that the reservation is set for the location based on the check and may also determine whether the user is associated with the reservation. Reservation component 820 may also determine that the user is associated with the reservation, where the sensory signal includes an indication that the location is a correct location and may also determine that the user is not associated with the reservation, where the sensory signal includes an indication that the location is not available.

Signal component 825 may provide a sensory signal based on the check. In some examples, the sensory signal includes a light pattern, a light color, an audio pattern, music, a haptic signal, or any combination thereof. In some examples, the indication signals a length of time that the location is available.

Signal component 825 may also provide an identifying signal for an available location and may also provide a confirmation at the available location that matches the identifying signal. In some examples, the sensory signal is transmitted from equipment at the location.

Signal component 825 may also transmit a signal to the personal electronic device, where the sensory signal is provided by the personal electronic device. In some examples, signal component 825 controls a smart lighting system, and the sensory signal includes a visual signal using the smart lighting system. Signal component 825 may also provide a subsequent sensory signal indicating that an end of the reservation is near and may also adjust the sensory signal over time as the reservation nears completion.

Accordingly, the present disclosure includes the following embodiments.

A system, method, apparatus and non-transitory computer readable medium for reservation signaling are described. Embodiments of the system, method, apparatus and non-transitory computer readable medium may determine that a user has entered a location, checking whether a reservation for the location is set for a current time period, and providing a sensory signal based on the check.

Another system, method, apparatus and non-transitory computer readable medium for reservation signaling are described. The system, method, apparatus and non-transitory computer readable medium may include a smart lighting system in addition to a processor, and a memory in electronic communication with the processor, and instructions stored in the memory. The instructions may be operable to cause the processor to identify an end time of a reservation for a room; provide a first lighting color for the room, wherein the first lighting color indicates a first time amount remaining before the end time; and provide a second lighting color for the room, wherein the second lighting color indicates a second time amount remaining before the end time.

Another system, method, apparatus and non-transitory computer readable medium for reservation signaling are described. In some examples, the system, method, apparatus and non-transitory computer readable medium are configured to: identify a user that has entered a location; determine that the user is not associated with a reservation for the location; provide a suggestion of a different location for the user, wherein the suggestion includes an indication of a sensory signal for the new location; and provide the sensory signal at the new location.

In some examples, the sensory signal comprises a light pattern, a light color, an audio pattern, music, a haptic signal, or any combination thereof. Some examples of the method, apparatus, and non-transitory computer readable medium described above may further include receiving input from a Wi-Fi occupancy sensor, a camera, a Bluetooth beacon sensor, a global positioning system (UPS) device, a door sensor, or any combination thereof, wherein the determination that the user has entered the location is based on the input. In some examples, the location comprises a conference room, an agile workspace, a phone booth, a desk, a workspace, an automobile, or any combination thereof.

Some examples of the method, apparatus, and non-transitory computer readable medium described above may further include determining that no reservation is set for the location based on the check, wherein the sensory signal comprises an indication that the location is available. In some examples, the indication signals a length of time that the location is available.

Some examples of the method, apparatus, and non-transitory computer readable medium described above may further include determining that the reservation is set for the location based on the check. Some examples may further include determining whether the user is associated with the reservation. Some examples of the method, apparatus, and non-transitory computer readable medium described above may further include determining that the user is associated with the reservation, wherein the sensory signal comprises an indication that the location is a correct location.

Some examples of the method, apparatus, and non-transitory computer readable medium described above may further include determining that the user is not associated with the reservation, wherein the sensory signal comprises an indication that the location is not available. Some examples of the method, apparatus, and non-transitory computer readable medium described above may further include providing an identifying signal for an available location.

Some examples of the method, apparatus, and non-transitory computer readable medium described above may further include providing a confirmation at the available location that matches the identifying signal. In some examples, the sensory signal is transmitted from equipment at the location.

Some examples of the method, apparatus, and non-transitory computer readable medium described above may further include determining that a personal electronic device of the user is at the location. Some examples may further include transmitting a signal to the personal electronic device, wherein the sensory signal is provided by the personal electronic device.

In some examples, the location is configured with a smart lighting system, and the sensory signal comprises a visual signal using the smart lighting system. Some examples of the method, apparatus, and non-transitory computer readable medium described above may further include providing a subsequent sensory signal indicating that an end of the reservation is near. Some examples of the method, apparatus, and non-transitory computer readable medium described above may further include adjusting the sensory signal over time as the reservation nears completion.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EE-PROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ, or XYZ. Also, the phrase "based on" is not used to represent a closed set of conditions. For example, a step that is described as "based on condition A" may be based on both condition A and condition B. In other words, the phrase "based on" shall be construed to mean "based at least in part on,"

What is claimed is:

1. A method for resource reservation, comprising:
   receiving a signal from a sensor at a location, wherein the signal includes data for identifying a person entering the location;
   determining that a user has entered the location based on the signal;
   identifying the user based on the signal;
   transmitting a request to a reservation scheduling system;
   receiving reservation information in response to the request;
   checking that a reservation for the location is set for a current time period based on the reservation information;
   determining that the user is associated with the reservation based on the identification of the user and the reservation information; and
   providing a sensory signal to the user based on the determination that the user is associated with the reservation, wherein the sensory signal comprises an indication that the location is a correct location.

2. The method of claim 1, wherein:
   the sensory signal comprises a light pattern, a light color, an audio pattern, music, a haptic signal, or any combination thereof.

3. The method of claim 1, further comprising:
   receiving input from a Wi-Fi occupancy sensor, a camera, a Bluetooth beacon sensor, a global positioning system (GPS) device, a door sensor, or any combination thereof, wherein the determination that the user has entered the location is based on the input.

4. The method of claim 1, wherein:
   the location comprises a conference room, an agile workspace, a phone booth, a desk, a workspace, an automobile, or any combination thereof.

5. The method of claim 1, further comprising:
   determining that no reservation is set for the location based on the check, wherein the sensory signal comprises an indication that the location is available.

6. The method of claim 5, wherein:
   the indication signals a length of time that the location is available.

7. The method of claim 1, wherein:
   the sensory signal is transmitted from equipment at the location.

8. The method of claim 1, further comprising:
   determining that a personal electronic device of the user is at the location; and
   transmitting a confirmation signal to the personal electronic device, wherein the sensory signal is provided by the personal electronic device.

9. The method of claim 1, wherein:
   the location is configured with a smart lighting system, and the sensory signal comprises a visual signal using the smart lighting system.

10. The method of claim 1, further comprising:
    providing a subsequent sensory signal indicating that an end of the reservation is near.

11. The method of claim 1, further comprising:
    adjusting the sensory signal over time as the reservation nears completion.

12. A method comprising:
    receiving a signal from a sensor at a location, wherein the signal includes data for identifying a person entering the location;
    determining that a user has entered the location based on the sensory signal;
    identifying the user based on the signal;
    transmitting a request to a reservation scheduling system;
    receiving reservation information in response to the request;
    checking that a reservation for the location is set for a current time period based on the reservation information;
    determining that the reservation is set for the location during the current time period based on the check; and
    determining that the user is not associated with the reservation based on the identification of the user and the reservation information; and
    providing a sensory signal to the user based on the determination that the user is not associated with the reservation, wherein the sensory signal comprises an indication that the location is not available.

13. The method of claim 12, further comprising:
    providing an identifying signal for an available location.

14. The method of claim 13, further comprising:
    providing a confirmation at the available location that matches the identifying signal.

15. An apparatus for reservation signaling comprising:
    a smart lighting system configured to provide a plurality of colors of room lighting;
    a processor; and
    a memory storing instructions and in electronic communication with the processor, wherein the processor is configured to execute the instructions to:

receive a signal from a sensor at a location, wherein the signal includes data for identifying a person entering the location;
determine that a user has entered a room based on the signal;
identify the user based on the signal;
transmit a request to a reservation scheduling system;
receive reservation information in response to the request;
check whether a reservation for the room is set for a current time period based on the reservation information;
determine that the user is associated with the reservation based on the identification of the user and the reservation information;
identify an end time of a reservation for a room; and
provide a sensory signal based on the determination that the user is associated with the reservation and based on the end time, wherein providing the sensory signal comprises:
  providing a first lighting color for the room, wherein the first lighting color indicates a first time amount remaining before the end time; and
  providing a second lighting color for the room, wherein the second lighting color indicates a second time amount remaining before the end time.

16. The apparatus of claim 15, wherein the processor is further configured to execute the instructions to:
gradually adjust the room lighting from the first lighting color to the second lighting color.

* * * * *